Figure 22:
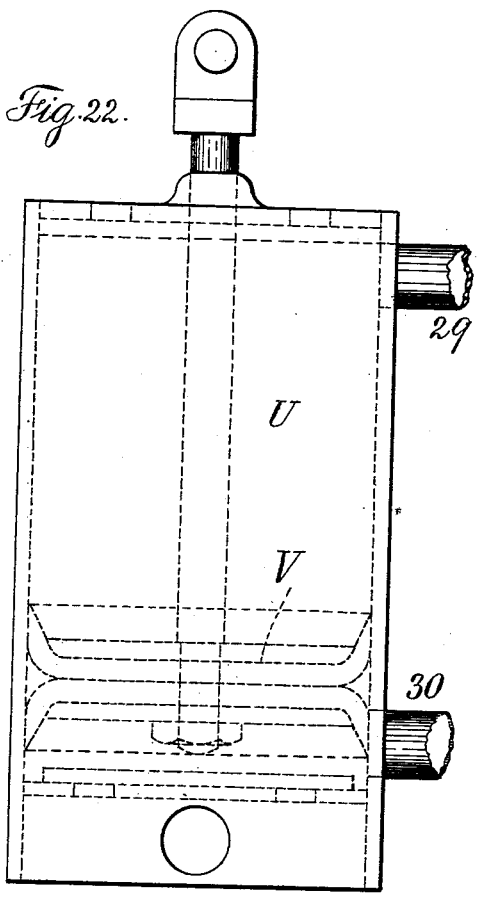

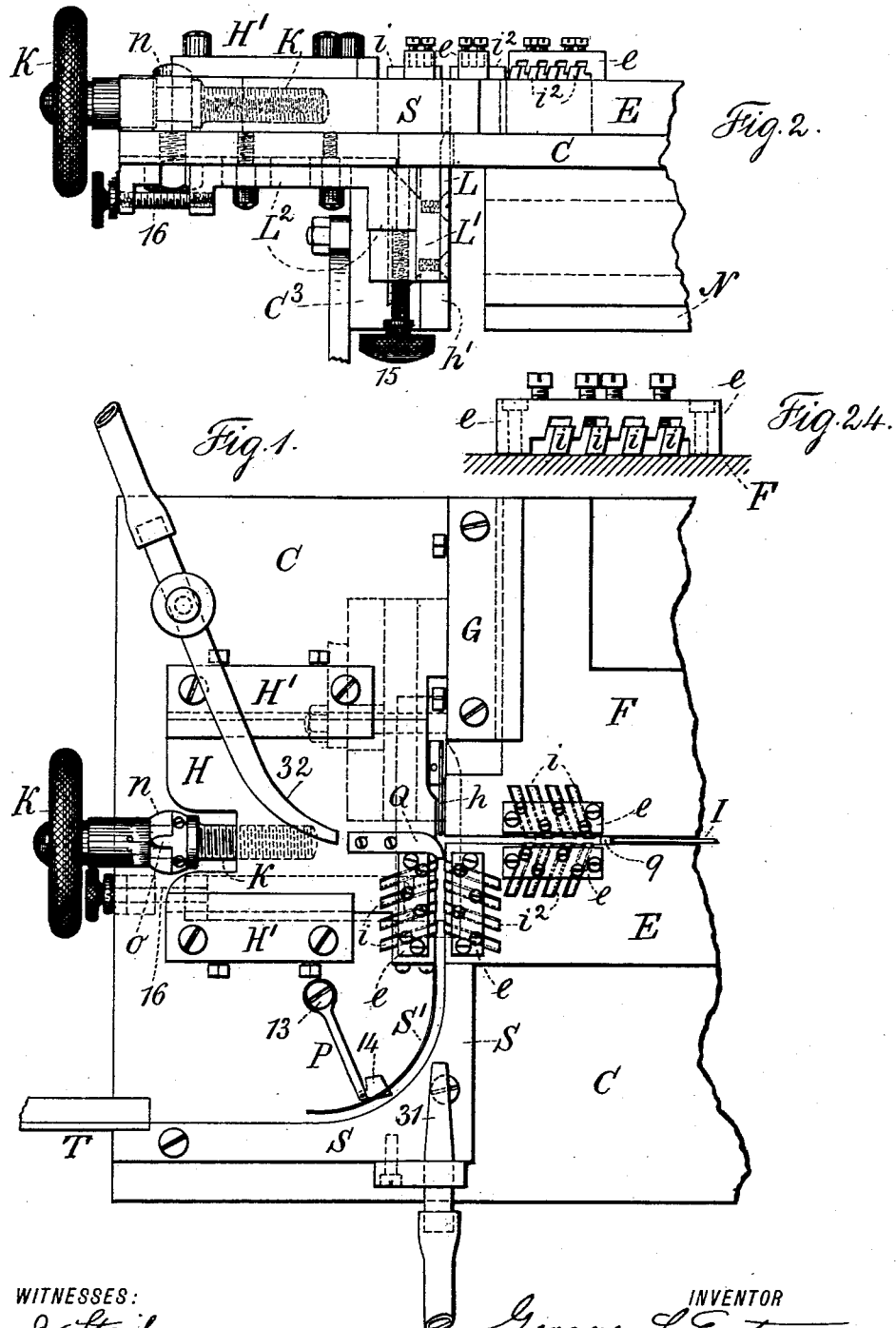

(No Model.) 4 Sheets—Sheet 2.
G. S. EATON.
TYPE FINISHING MACHINE.
No. 580,125. Patented Apr. 6, 1897.
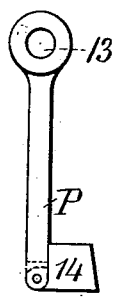
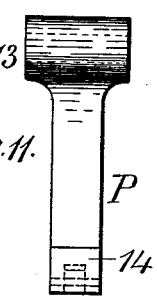
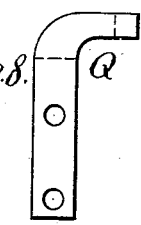
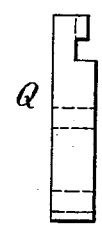
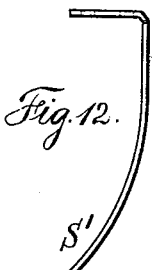
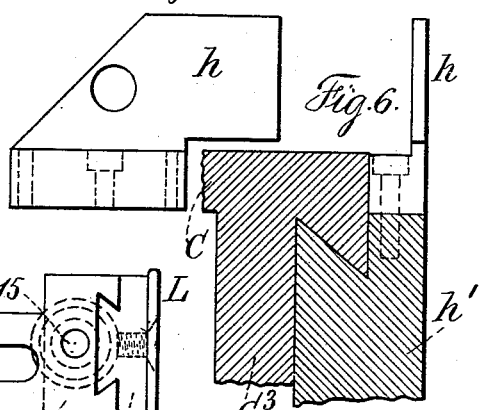
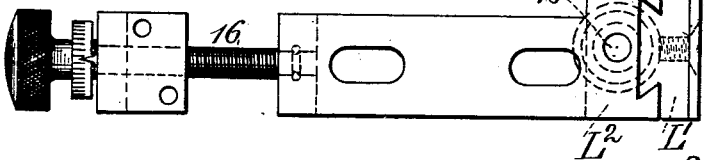
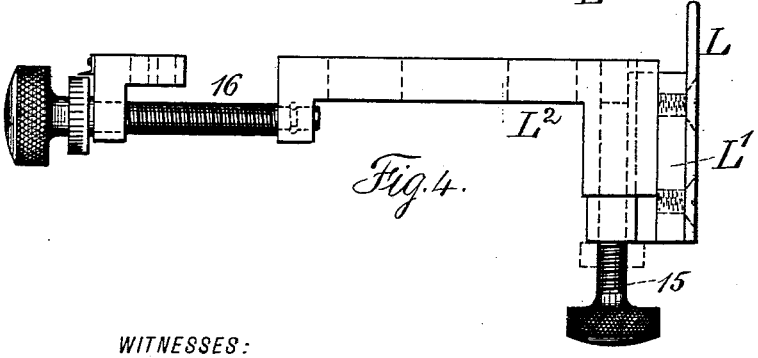
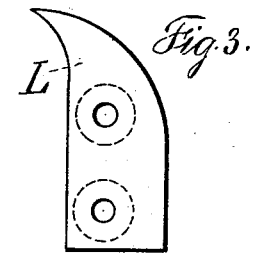
WITNESSES:
INVENTOR
George S. Eaton
BY
Lemuel W. Serrell
ATTORNEY.

(No Model.) 4 Sheets—Sheet 3.
G. S. EATON.
TYPE FINISHING MACHINE.
No. 580,125. Patented Apr. 6, 1897.
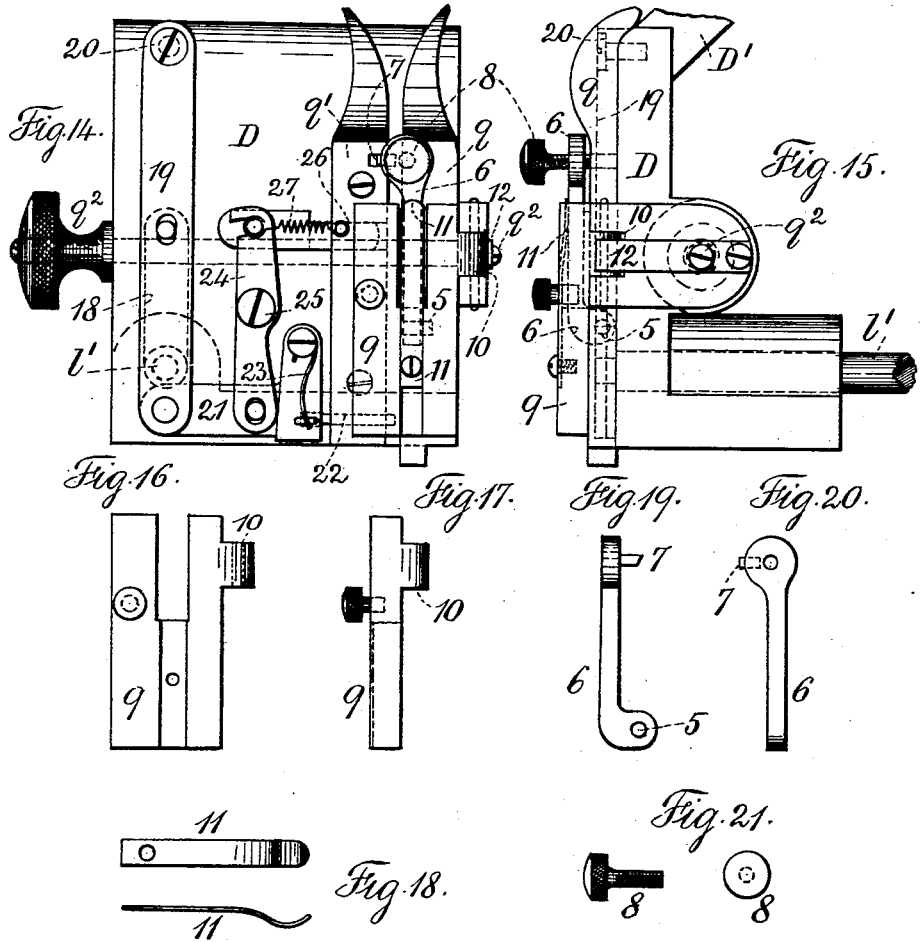
WITNESSES:
J. Staib
Chas H Smith
INVENTOR
George S. Eaton
BY
Lemuel W. Serrell
ATTORNEY.

(No Model.)

G. S. EATON.
TYPE FINISHING MACHINE.

No. 580,125.

4 Sheets—Sheet 4.

Patented Apr. 6, 1897.

WITNESSES:
J. Staib
Chas. H. Smith

INVENTOR
George S. Eaton
BY
Lemuel W. Serrell
ATTORNEY.

THE NORRIS PETERS CO., PHOTO-LITHO., WASHINGTON, D. C.

UNITED STATES PATENT OFFICE.

GEORGE S. EATON, OF BROOKLYN, NEW YORK, ASSIGNOR TO THE EATON TYPE FINISHING MACHINE COMPANY, OF JERSEY CITY, NEW JERSEY.

TYPE-FINISHING MACHINE.

SPECIFICATION forming part of Letters Patent No. 580,125, dated April 6, 1897.

Application filed November 11, 1895. Serial No. 568,551. (No model.)

*To all whom it may concern:*

Be it known that I, GEORGE S. EATON, a citizen of the United States, residing in the city of Brooklyn, in the county of Kings and State of New York, have invented an Improvement in Type-Finishing Machinery, of which the following is a specification.

In Letters Patent No. 380,559, granted April 3, 1888, a type-rubbing machine is represented in which the types are carried through between cutters for dressing or rubbing the sides of the type, and in Patent No. 380,558 a somewhat similar device is represented in which the types are carried through between cutters for rubbing the sides of the type, and then they are carried through between other cutters for dressing the top and bottom edges of the types, and from these cutters the types are carried off at right angles into a curved raceway in which the types are passed to a galley, and in Patent No. 457,575, granted August 11, 1891, a type-rubbing machine is represented in which the types are carried through between adjustable cutters and then conveyed away at right angles into a segmental channel and received upon a rule or galley.

The present invention is made with reference to overcoming defects which have been discovered in the details of construction and operation of the type rubbing and dressing machines represented in the said patents, and the present improvements relate to the peculiarities of construction hereinafter described and claimed.

In my present improvements I make use of a feeding-incline generally similar to that represented in Patent No. 457,575, and the types are carried through between stationary cutters by a pusher that is reciprocated a distance sufficient to carry one type at a time through between such cutters and between the equalizers that act upon the bodies of the types, and the types are delivered one at a time into a channel at right angles and between equalizers and cutters that dress the top and bottom portions of the letters, and the types are set up in line and move along through between the cutters as a line of types, so that they aid in supporting each other, and they pass directly into a segmental channel and are delivered upon a removable rule or galley, as in the aforesaid patents, and while being moved along between the equalizers as a line of types and dressed, as aforesaid, the lower ends of the types are grooved by a tool that is adjustable for scoring or grooving the bases of the types.

It sometimes happens that a projection is left at the base of a type when the gate or sprue is broken off, and if a type of this character were allowed to pass through the machine the groove at the bottom would not be properly cut. I therefore employ a stationary device with which the letter end of the type is brought into contact in consequence of its elevated position. This device I term a "destroyer," because it injures the face of the type, so that the same is thrown out by the inspector when the types are examined in the line, so that such defective type will be remelted.

In the machines before referred to the chips or particles of metal that are cut or shaved off from the bases of the letters have been blown away by a substantially continuous blast. I find that in consequence of the dressing or rubbing operations being at right angles it is necessary to employ two nozzles for the jets of air, but where these are continuous the air of one jet interferes with the action of the air of another jet, and particles of metal that are exposed to a continuous blast are liable to accumulate and be held in position by the action of the air. To overcome this difficulty, I combine with the nozzles for the jets of air a double-acting pump and flexible connections from the same to the respective nozzles, so that the jets of air alternate in their operations—that is to say, the piston of the pump when moving in one direction forces the air through one jet and when moving in the other direction forces the air through the other jet—and these jets, acting at right angles and alternately, serve to effectually dislodge chips and particles of metal because such chips or particles of metal are exposed to the action of alternating currents of air in different directions.

In the drawings, Figure 1 is a general plan view perpendicular to the inclined bed. Fig. 2 is an elevation representing the adjusting devices. Fig. 3 represents the grooving-tool detached. Fig. 4 is a side view of the holder and grooving-tool, and Fig. 5 is a plan view of the same. Fig. 6 is an end view of the second pusher and a section of part of the bed of the machine. Fig. 7 is a side view of this pusher detached. Fig. 8 is a plan view of the destroyer detached, and Fig. 9 is a side view of the same. Fig. 10 is a side view, and Fig. 11 a view at right angles, of the sustaining-finger. Fig. 12 is an edge view, and Fig. 13 a side view, of the spring-sector. Fig. 14 is a plan view perpendicular to the inclined bed containing the feeding devices. Fig. 15 is an edge view of such bed. Fig. 16 is a plan and Fig. 17 an edge view of the hinged cover to the feeding-slide. Fig. 18 shows the spring of the said slide flatwise and edgewise. Fig. 19 is an edge view, and Fig. 20 a plan, of the hinged stop in the channel of the feeding-slide. Fig. 21 shows the adjusting-screw for the hinged stop. Fig. 22 is an elevation, and Fig. 23 a section, of the pump made use of for the air-jets and Fig. 24 is a detached view of the face of one of the bridges and cutters carried thereby.

It is to be understood that the bed C is advantageously placed at an inclination and that the plate D, Fig. 14, is perpendicular to the same, and the two stand in substantially the same relative positions as in Patent No. 457,575, so that the type are fed by the attendant from the table, a part of which is shown at D', down upon the surface of the inclined plate D, so that their lower ends or bases pass down between the fixed or stationary equalizer E and the movable equalizer F, and the devices employed in connection with the feed-channel upon the plate D are similar to those in said patent—that is to say, there is a stationary guide $q'$ and a movable guide $q$, that is adjusted by the set-screw $q^2$ to vary the width of the channel between such guides $q$ and $q'$, and the rock-shaft $l'$ gives motion to a crank-arm 18 and swinging lever 19, that acts upon the slide 21 to move the bolt 22 and either arrest the movement of a type as it slides down between the guides $q$ and $q'$ or allow such type to slide down at the proper time for passing in between the stationary equalizer E and movable equalizer F; and in Fig. 14 the same letters of reference are introduced as are used in the said Patent No. 457,575, and a reference is hereby made to the same for those parts which correspond.

The differences that exist between this part of the apparatus and that before patented relate to the hinged stop 6, which is pivoted at 5 upon the guide $q$ and at one side of the channel between the guides $q$ and $q'$, such hinged stop having through its moving end a screw 8, by which it may be adjusted to raise or lower the finger 7, which is in the form of a plate projecting laterally and passing into a notch in the guide $q'$. This finger 7 determines the space between its lower edge and the surface of the plate D, so that in cases where the attendant may place the type incorrectly in the feed-channel the stop-finger will prevent the same passing down into the machine.

Another feature of the present improvement relates to the cover 9 to the feed-channel, which cover is hinged at 10 at the side of the adjustable guide $q$, and there is a spring 12 acting against a knuckle upon the hinge 10 so as to tend to press the cover 9 down into position, and the spring 11, which is attached to this cover and projects over the hinged stop 6, holds such stop down with the necessary yielding pressure. The cover 9 aids in preventing any chips cut from the types passing into the feed-channel and obstructing the movement of the types, and this cover being attached to the guide $q$ is movable with the same, as such guide may be adjusted to vary the width of the feed-channel, the hinged stop 6 being moved at the same time, and the finger 7 is sufficiently wide not to pass out of the slot in the guide $q'$ when the feed-channel is adjusted to a larger size of type.

The movable equalizer F is set in guides G and can be adjusted toward and from the stationary equalizer E, as in the aforesaid patent, a screw being employed for that purpose. (Not shown in the drawings.)

One of the peculiarities of the present machine consists in arranging a second movable equalizer H in guides H', so that the end of the stationary equalizer E can be used in connection with this movable equalizer H to form a channel through which the types are carried while the dressing operation is being performed.

The adjusting-screws by which the equalizers F and H are moved are to be made with very fine screw-threads, so that the adjustment may be very gradual and accurate, and both screws are advantageously made in the manner shown in Fig. 1, wherein the screw K is represented as passing through a stationary stud $n$, and in which it can be rotated without the screw moving endwise, and upon the body of the screw there are equidistant marks or degrees and a fixed pointer $o$ upon the stud $n$, so that by turning the screw K by its hand-wheel to bring any desired number around to the pointer $o$ the equalizer will be adjusted to give the proper width of channel between the faces of the stationary and movable equalizers, and it is to be understood that the space between the stationary equalizer E and the movable equalizer F is to correspond to the height of the letters or what is usually known as the "number-point" of the type, and the width of the channel between the end of the stationary equalizer E and the movable equalizer H is to correspond to the width of the letter, so that the body of the type will be properly smoothed and equalized in passing through between the respective equalizers by the action of the pushers.

In the aforesaid patent the cutters $i$ $i^2$ are represented as trapezoidal sectionally and as resting upon the stationary and movable equalizers and held in position by screws passing through bridges. I find it difficult to easily blow away the chips or particles of metal that are removed by these cutters from the bases of the letters. To obviate this difficulty, I make the bridges e so that their end portions rest upon and are attached firmly to the upper surfaces of the equalizers, but the middle portions of the bridges are removed, as seen in Fig. 24, so that there will be a free space for the chips and particles of metal to be blown through beneath the middle portions of the bridges, and the upper portions of the cutters are held in the diagonal grooves in the under faces of the bridges, so that such cutters cannot be displaced, but it is only necessary to have such grooves to receive and hold the upper parts of the cutters, the lower portions of the cutters simply resting upon the surface of the equalizer. The clamping-screws used to hold the individual cutters are similar to those in the aforesaid patent.

The pusher which first acts upon the types is substantially the same as that in the aforesaid patent, and a portion of this is represented at I, and it is to be actuated in a similar manner, and it carries each type in succession along from the point of reception through between the equalizers E and F, while the bases of the letters are removed by the first set of cutters, this operation usually being known as "type rubbing," and the parts are adjusted so that the pusher I brings the advancing side of the type up against the equalizer H, so that the same is in a position ready to be carried off at right angles into the channel between the end of the equalizer E and the movable equalizer H, and the second set of cutters is made in the same manner as those before described and rest at the end of the equalizer E and upon the surface of the movable equalizer H.

I make use of a second pusher h, which is attached to a slide h', that is supported in a slide-rest C³ upon the under side of the bed C, there being a channel through the bed C in which the pusher h is received, and upon reference to Figs. 6 and 7 it will be observed that this pusher h can be removed by taking out the screw that attaches it to the slide h', the object being to change the pusher according to the type that is being rubbed, and to facilitate the lifting out of this pusher and the insertion of another the face of the equalizer H is recessed, as seen in Fig. 1, to give room for the insertion of a screw-driver and of a hook to pass into the hole in the pusher for lifting the same out.

Any suitable means actuated by the driving-shaft is to be employed for giving motion to the slide h' and pusher h, but the movement is only sufficient for pushing one type at a time along sufficiently far for the end of the pusher h to be in line with the surface of the stationary equalizer E, so that there will be room for the next type to pass into position as this pusher h draws back, and by this means the types will be set up in a continuous line between the equalizers E and H, and this I find to be of great advantage, because it prevents the types becoming displaced while being acted upon by the second set of cutters for dressing the top and bottom edges of the letters, and also for holding the types firmly in position while the bases or lower ends of the types are channeled, as hereinafter described, and in consequence of the types being set up in line between the equalizers E and H it is only necessary to maintain the types in such line while they are being passed along to a rule or holder T, which is movable, so that the lines of type, as dressed and set up, can be taken out for examination, another rule or holder being inserted in place of the one removed.

In passing the line of types down from between the equalizers E and H a stationary segmental block S is provided, and I use a spring-sector S', connected at its upper end to the equalizer H, so as to be adjusted therewith, and the lower end of this equalizer will spring sufficiently to accommodate different sizes of type, but it is important to prevent the types falling or becoming displaced when such types are first being passed down from between the equalizers and around upon the surface of the stationary block S, and to support the advancing end of the line of types I employ the sustaining-finger P, pivoted at 13 and having a hinged claw 14 at the end, as seen in Figs. 10 and 11, which claw passes through a longitudinal opening in the spring-sector S', and the friction of the sustaining-finger upon its pivot is to be sufficient for supporting the line of types. Hence it is only necessary to swing the sustaining-finger so that the claw 14 will come adjacent to the end of the channel between the equalizers E and H, and the advancing end of the line of types will come against such finger and be supported by the same as the finger is pressed downwardly and swings upon its pivot, and the line of types emerges from between the spring-sector S' and the sustaining-block S and passes along upon the rule T, and it will be understood that the claw 14 is swung up out of the way by coming in contact with and overriding the lower end of the spring-sector.

In consequence of the equalizer E being affixed rigidly to the bed of the machine it is adapted to receive against it the parts that are employed in feeding in the types, and the equalizer F is opposite to one of the faces of the equalizer E, and the second movable equalizer H is opposite to the end face of the stationary equalizer E, and these equalizers F and H can be adjusted with facility for adapting the machine to different sizes of type-bodies, and the segmental block S is also stationary with its upper end against the stationary equalizer E, and the types are passed directly from between the equalizers E and H into the concave of the segmental block S, and no adjustment of this segmental block S is required, and the spring-sector S', being attached to the equalizer H, is adjusted with it, but it is not always necessary to use this spring-sector S', because the type will be pressed along gradually against the concave side of the stationary segmental block as the line of types is progressed gradually between the equalizers E and H.

When the types are cast, there is usually a projecting gate or sprue at the lower end which has to be broken off, and where the fracture leaves any projection at the base of the type such projection will raise the type in consequence of resting upon the surface of the bed, and types having such projections are not in a position to be properly grooved or channeled in their bases. For this reason I place a bar with a downwardly-projecting end over the channel between the equalizers E and H. This device I call a "destroyer," and the same is shown in Figs. 8 and 9, the object being to injure the surfaces of the types that are lifted by any projection on the base by the types coming into contact with the under surface of this destroyer Q. Hence when the types are examined in line, as usual, the injury to the face of the type will indicate that such type is to be thrown out for remelting. All those types which do not come in contact with the destroyer are in a position to be properly channeled in their bases by the grooving-tool L. (Shown in Figs. 3, 4, and 5.) This grooving-tool is usually made with a rounded claw-shaped end corresponding in shape to the groove in the base of the type, and such tool is held upon a stock L', that is supported at the end of the slide $L^2$, which slide is held to the under side of the bed C by screws passing through elongated openings, and the screw 15 is adapted to adjusting the stock L' and regulating the depth of cut of the grooving-tool, and the screw 16 is used for adjusting the slide $L^2$ for bringing the grooving-tool central to the base of the type and thus adapting the tool to different sizes of types.

Figure 23:
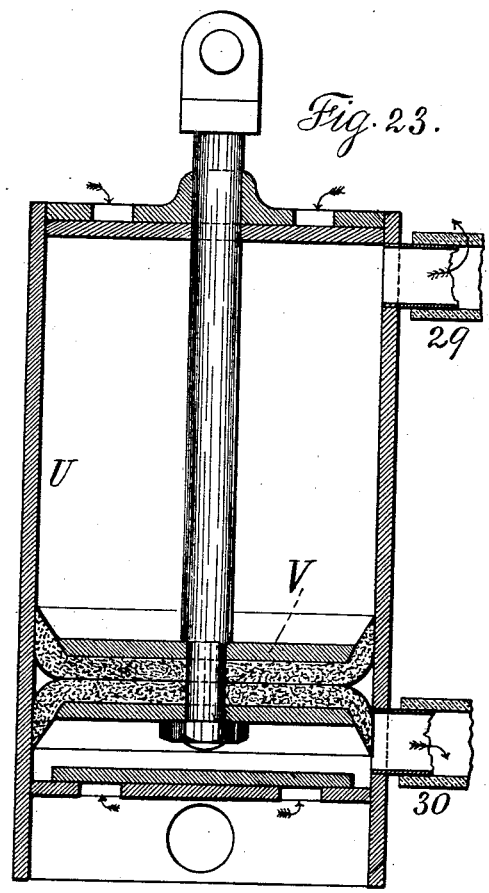

The pump-cylinder U has within it a piston V, which is reciprocated by a suitable connecting-rod to a crank-pin upon the driving-shaft of the machine, and there are inlet-openings and valves at the ends of the pump-cylinder which may be of any desired character, as illustrated in Figs. 22 and 23, and the air is blown through the tubes 29 and 30 alternately, and these tubes are advantageously flexible and lead to nozzles 31 and 32 in line with the respective channels between the stationary and adjustable equalizers, so that the issuing jets of air will alternate, and the nozzles are sufficiently distant from the groups of cutters for the air to act more or less at both sets of cutters. Hence the direction in which the jets of air act will be at right angles, or nearly so, and, alternating, will loosen and blow away the chips or particles of metal cut from the bases of the letters with reliability, so as to avoid the possibility of the cutters becoming clogged and inoperative.

In the aforesaid patent the traveling table 9 is below the end of the pusher I and receives upon it the types as fed into the machine. In the present improvement it is proper to time the parts so that the second pusher h will act to carry the type off between the equalizers E and H before the pusher I with its table draws back, so that the type will be received and held between the equalizers E and H, and if a type that is too small has been carried in it will drop away through the hole in the bed as the table is drawn back, the same as in the aforesaid patent.

I claim as my invention—

1. The combination in a type-finishing machine, of a bed inclined backward from the bottom to the top, a stationary equalizer upon such bed having two guiding-faces at right angles to each other, an adjustable equalizer above the stationary equalizer, the channel between said equalizers being substantially horizontal and receiving into it the type to be finished, cutters at each side of the said horizontal channel, a reciprocating pusher for carrying each type in succession entirely through such channel, a second adjustable equalizer at the vertical end of the stationary equalizer, and cutters at each side of the intervening channel, a pusher for moving the line of types gradually downward in this channel as the types are added successively, a curved channel at the lower part of the downwardly-inclined channel and around which the line of types passes, and a rule or holder substantially horizontal for receiving the line of types, substantially as specified.

2. The combination in a type-finishing machine, of a bed inclined backward from the bottom to the top, a stationary equalizer upon such bed having two guiding-faces at right angles to each other, an adjustable equalizer above the stationary equalizer, the channel between said equalizers being substantially horizontal and receiving into it the type to be finished, cutters at each side of the said horizontal channel, a reciprocating pusher for carrying each type in succession entirely through such channel, a second adjustable equalizer at the vertical end of the stationary equalizer, and cutters at each side of the vertical channel, a pusher for moving the line of types gradually downward in the channel as the types are added successively, a block below the stationary equalizer having a curved upper face, and a spring-sector adjacent thereto, there being a curved channel between the stationary block and the spring-sector forming a continuation of the vertical channel between the equalizers, substantially as set forth.

3. The combination in a type-finishing machine, of a bed inclined backward from the bottom to the top, a stationary equalizer upon such bed, an adjustable equalizer at the vertical end of the stationary equalizer and cutters at each side of the intervening channel, a pusher for moving the line of types gradually downward in this channel as the types are added successively, a curved channel at the lower part of the downwardly-inclined channel around which the line of types passes, and a rule or holder substantially horizontal for receiving the line of types as they are moved downward and progressively, substantially as set forth.

4. The combination in a type-finishing machine, of a bed inclined backward from the bottom to the top, a stationary equalizer upon such bed, an adjustable equalizer at the vertical end of the stationary equalizer and cutters at each side of the vertical channel, a pusher for moving the line of types gradually downward in the channel as the types are added successively, a stationary block below the stationary equalizer having a curved upper surface forming a continuation of the vertical end of the equalizer, a spring-sector attached to the adjustable equalizer and forming a continuation of the vertical side of such equalizer and parallel to the curved surface of the stationary block whereby the spring-sector is adjusted simultaneously with the adjustment of the movable equalizer, substantially as set forth.

5. The combination in a type-finishing machine, of a bed inclined backward from the bottom to the top, a stationary equalizer upon such bed, an adjustable equalizer at the vertical end of the stationary equalizer and cutters at each side of the intervening channel, a pusher for moving the line of types gradually downward in this channel as the types are added successively, a curved channel at the lower part of the downwardly-inclined channel around which the line of types passes, a rule or holder substantially horizontal for receiving the line of types as they are moved downward and progressively, a hook-shaped grooving-tool, a stock for supporting the grooving-tool with the point slightly above the bottom of the downward-inclined channel and a slide and screw for adjusting the grooving-tool centrally to the vertical channel, substantially as set forth.

6. The combination in a type-finishing machine, of a bed inclined backward from the bottom to the top, a stationary equalizer upon such bed, an adjustable equalizer at the vertical end of the stationary equalizer and cutters at each side of the intervening channel, a pusher for moving the line of types gradually downward in this channel as the types are added successively, a curved channel at the lower part of the downwardly-inclined channel around which the line of types passes, a rule or holder substantially horizontal for receiving the line of types as they are moved downward and progressively, a hook-shaped grooving-tool, a stock for supporting the grooving-tool with the point slightly above the bottom of the downwardly-inclined channel, a slide and screw for adjusting the grooving-tool centrally to the said channel, and a screw for moving the stock and raising or lowering the point of the grooving-tool, substantially as set forth.

7. The combination in a type-finishing machine, of a bed inclined backward from the bottom to the top, a stationary equalizer upon such bed having two guiding-faces at right angles to each other, an adjustable equalizer above the stationary equalizer, the channel between said equalizers being substantially horizontal and receiving into it the type to be finished, cutters at each side of the said horizontal channel, a reciprocating pusher for carrying each type in succession entirely through such channel, a second adjustable equalizer at the vertical end of the stationary equalizer, and cutters at each side of the intervening channel, a pusher for moving the line of types gradually downward in this channel as the types are added successively, a curved channel at the lower part of the downwardly-inclined channel and around which the line of types passes, a rule or holder substantially horizontal for receiving the line of types, a grooving-tool projecting through the bed at the base of the downwardly-inclined channel and means for adjusting the same, substantially as set forth.

8. The combination in a type-dressing machine, of equalizers and cutters sustained by the equalizers, a pusher for moving a line of type along progressively between the equalizers while the bases of the letters are being dressed by the cutters, a stationary segmental block against the concave side of which the line of types passes directly from between the equalizers, and a yielding sustaining-finger contiguous to the concave surface of the segmental block and adapted to support the end type in the line of types, as such line of types is moved progressively against the concave side of the stationary segmental block, substantially as set forth.

9. The combination in a type-dressing machine with the equalizers and a bed upon which the equalizers are fastened parallel to each other, cutters fastened upon the equalizers, and a pusher for moving the line of types along progressively in a channel between the equalizers, of a concave stationary segment at the end of the channel, a sustaining-finger pivoted at or near the center of the segment and adapted to be moved by the pressure of the types as they are moved along the curved surface of the stationary segment, and a convex spring-sector near the segment and having an opening in it through which the end of the sustaining-finger passes, substantially as set forth.

10. The combination in a type-dressing machine with the equalizers and a bed upon which the equalizers are fastened parallel to each other, cutters fastened upon the equalizers, and a pusher for moving the line of types along progressively in a channel between the equalizers, of a concave stationary segment at the end of the channel, a sustaining-finger pivoted at or near the center of the segment and adapted to be moved by the pressure of the types as they are moved along the curved surface of the stationary segment, and a convex spring-sector near the segment and having an opening in it through which the end of the sustaining-finger passes, the end of the sustaining-finger being made as a pivoted claw that is withdrawn by contact with the end portion of the spring-sector, substantially as set forth.

11. The combination in a machine for rubbing and dressing types, of equalizers between which the types are sustained, means for moving such types through between the equalizers and a stationary destroyer above the channel between the equalizers for marring the faces of such types as may stand too high in the line of types, substantially as set forth.

12. The combination in a type-finishing machine, of equalizers for sustaining the type-bodies in the channel between them, cutters adjacent to the equalizers for dressing the bases of the letters, pushers and means for operating the same at right angles to each other and moving the type-bodies within the channels between the equalizers, a grooving-tool below one of the channels for acting upon the bases of the types, and a stationary destroyer above one of the channels and near the cutters for marring the faces of the types that may stand too high for the grooving-tool, substantially as set forth.

13. The combination in a type-finishing machine, of equalizers and cutters adjacent to the equalizers and means for moving the types along progressively in the channel between the equalizers, a grooving-tool below the type-channel for acting upon the bases of the letters, and a stationary destroyer above the type-channel for marring the faces of the types that may stand too high for the grooving-tool, substantially as set forth.

14. The combination with the feed-plate and the adjustable guides thereon between which the types are fed, of a hinged cover over the feed-channel, a pivoted stop having a finger across the feed-channel, and an adjusting-screw for raising or lowering such finger, substantially as set forth.

15. The combination in a type rubbing or dressing machine with the equalizers, cutters and pusher, of a pump and tubes and nozzles for directing currents of air substantially at right angles to each other upon the cutters for dislodging and blowing away the chips and particles of metal dressed from the types, substantially as set forth.

16. The combination with the stationary and adjustable equalizers and the pusher in a type-finishing machine, of cutters, bridges secured to the equalizers and channeled for the reception of the upper edges of the cutters, there being spaces between the lower sides of the bridges and the upper surfaces of the equalizers for the passage of chips and particles of metal dressed from the types by the action of the cutters, substantially as set forth.

Signed by me this 6th day of November, 1895.

GEO. S. EATON.

Witnesses:
GEO. T. PINCKNEY,
S. T. HAVILAND.